(12) United States Patent
Tokunaga et al.

(10) Patent No.: US 11,085,539 B2
(45) Date of Patent: Aug. 10, 2021

(54) SEAL DEVICE

(71) Applicant: EAGLE INDUSTRY CO., LTD., Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Hidetoshi Kasahara, Tokyo (JP); Jun Hiromatsu, Tokyo (JP); Yasuhiro Kuroki, Tokyo (JP); Ryu Kikuchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 92 days.

(21) Appl. No.: 16/488,097

(22) PCT Filed: Feb. 16, 2018

(86) PCT No.: PCT/JP2018/005371
§ 371 (c)(1),
(2) Date: Aug. 22, 2019

(87) PCT Pub. No.: WO2018/155315
PCT Pub. Date: Aug. 30, 2018

(65) Prior Publication Data
US 2020/0063871 A1    Feb. 27, 2020

(30) Foreign Application Priority Data
Feb. 22, 2017 (JP) .............................. JP2017-031200

(51) Int. Cl.
*F16J 15/30* (2006.01)
*F16J 15/34* (2006.01)
(Continued)

(52) U.S. Cl.
CPC ......... *F16J 15/3472* (2013.01); *F01D 11/003* (2013.01); *F16J 15/24* (2013.01); *F16J 15/441* (2013.01)

(58) Field of Classification Search
CPC ........ F16J 15/3432; F16J 15/44; F16J 15/441; F16J 15/442
See application file for complete search history.

(56) References Cited

U.S. PATENT DOCUMENTS 2,964,339 A * 12/1960 Macks .................... F16J 15/441
                                                                277/422
3,333,855 A *  8/1967 Andresen ................. F16J 15/30
                                                                277/581
(Continued)

FOREIGN PATENT DOCUMENTS

JP    S57154562 A    9/1982
JP    H09512084 A   12/1997
(Continued)

OTHER PUBLICATIONS

International Search Report (ISR) dated May 22, 2018, issued for International application No. PCT/JP2018/005371. (1 page).

*Primary Examiner* — Gilbert Y Lee
(74) *Attorney, Agent, or Firm* — Law Office of Katsuhiro Arai

(57) ABSTRACT

A sealing device includes a floating ring in a space between the outer circumference of a rotating shaft and the inner circumference of a housing, and a multi-layered cylindrical body including a plurality of elastically deformable cylindrical thin plates layered on top of each other provided between an outer peripheral surface of the floating ring and an inner peripheral surface of the housing, so as to impart a radial restoring force against the eccentricity of the rotating (Continued)

shaft to restore it to its center position, and a tangential damping force to reduce the whirling of the rotating shaft.

4 Claims, 3 Drawing Sheets

(51) Int. Cl.
  *F01D 11/00*   (2006.01)
  *F16J 15/24*   (2006.01)
  *F16J 15/44*   (2006.01)

(56) References Cited

U.S. PATENT DOCUMENTS

| | | | |
|---|---|---|---|
| 3,756,673 A * | 9/1973 | Strub | F16C 17/03 |
| | | | 384/117 |
| 5,014,999 A * | 5/1991 | Makhobey | F01D 11/003 |
| | | | 277/422 |
| 5,603,574 A * | 2/1997 | Ide | F16F 15/0237 |
| | | | 384/117 |
| 2009/0121440 A1* | 5/2009 | Feistel | F16J 15/26 |
| | | | 277/308 |

FOREIGN PATENT DOCUMENTS

| JP | H10196800 A | 7/1998 |
|---|---|---|
| JP | 2000310342 A | 11/2000 |

* cited by examiner

SEAL DEVICE

CROSS-REFERENCE TO RELATED APPLICATIONS

This application is the U.S. National Phase under 35 U.S.C. § 371 of International Application PCT/JP2018/005371, filed Feb. 16, 2018, which claims priority to Japanese Patent Application No. JP 2017-031200, filed Feb. 22, 2017. The International Application was published under PCT Article 21(2) in a language other than English.

TECHNICAL FIELD

The present invention relates to a sealing device suitable for a rotating shaft, and more particularly, relates to a sealing device including a floating ring, which is a noncontact annular seal, suitable for a shaft seal part of a large-sized high-speed rotating machine, or a rotating shaft of a turbopump for a liquid-fuel cryogenic rocket engine, or the like.

BACKGROUND ART

In high-speed rotating equipment such as a cryogenic liquid fuel turbopump for a rocket engine, the shaft vibration of a rotating shaft has frequently presented a problem. Increases in shaft vibration in the manner of self-excited vibration could result in not only the breakdown of the machine but also a serious accident. Thus, techniques for reducing shaft vibration have been studied.

As a sealing device including a floating ring, for example, one disclosed in JP 57-154562 A (hereinafter, referred to as "Patent Document 1") is known (hereinafter, referred to as "Conventional Art 1"). In Conventional Art disclosed in Patent Document 1, a plurality of leaf springs is provided circumferentially at equal intervals at the outer circumference of an annular floating ring provided around a rotating shaft, the leaf springs are supported on a housing, which is the stationary side, and the floating ring is installed in a floating state by the leaf springs, to dampen the vibration of the floating ring in a direction perpendicular to the axis caused by the vibration of the rotating shaft, and to maintain a constant clearance between the inner peripheral surface of the floating ring and the rotating shaft by the wedge effect generated between the inner peripheral surface of the floating ring and the rotating shaft (the effect of dynamic pressure generated at a wedge portion) and the Lomakin effect (the aligning effect due to inflow losses between the surfaces of the seal ring and the shaft when seal differential pressure develops).

As another sealing device including a floating ring, one disclosed in JP 2000-310342 A (hereinafter, referred to as "Patent Document 2") is known (hereinafter, referred to as "Conventional Art 2"). In Conventional Art 2 disclosed in Patent Document 2, support means including an annular holder and a cylindrical sleeve is provided on the low-pressure side of an annular floating ring provided around a rotating shaft, so as not to prevent the alignment action of the floating ring even when frictional resistance acting between the annular holder and the floating ring increases.

The sealing device including the floating ring in Conventional Art 1 can damp the vibration of the floating ring in the direction perpendicular to the axis caused by the vibration of the rotating shaft by the plurality of leaf springs at the outer circumference of the floating ring, but it does not have the technical idea of reducing the vibration of the rotating shaft.

The sealing device including the floating ring in Conventional Art 2 is limited to not preventing the alignment action of the floating ring even when frictional resistance acting between the annular holder and the floating ring increases, and it does not have the technical idea of reducing the vibration of the rotating shaft.

CITATION LIST

Patent Documents

Patent Document 1: JP 57-154562 A
Patent Document 2: JP 2000-310342 A

SUMMARY OF THE INVENTION

Problem to be Solved by the Invention

It is an object of the present invention to provide a sealing device including a floating ring around a rotating shaft, which prevents leakage and also has the effect of reducing the vibration of the rotating shaft by, first, imparting a tangential damping force to reduce the whirling of the rotating shaft, and secondly, imparting a radial restoring force against the eccentricity of the rotating shaft to restore it to its center position.

Means for Solving Problem

To attain the above object, a sealing device according to a first aspect of the present invention includes a floating ring in a space between an outer circumference of a rotating shaft and an inner circumference of a housing, and a multi-layered cylindrical body including a plurality of elastically deformable cylindrical thin plates layered on top of each other provided between an outer peripheral surface of the floating ring and an inner peripheral surface of the housing.

According to this aspect, the sealing device capable of imparting a tangential damping force to reduce the whirling of the rotating shaft to prevent leakage and also have the effect of reducing the vibration of the rotating shaft can be provided.

According to a second aspect of the present invention, in the sealing device in the first aspect, the multi-layered cylindrical body may be formed in a circumferentially corrugated shape.

According to this aspect, the sealing device capable of imparting a radial restoring force against the eccentricity of the rotating shaft to restore it to its center position, to prevent leakage and also have the effect of reducing the vibration of the rotating shaft can be provided.

According to a third aspect of the present invention, in the sealing device in the first or second aspect, the multi-layered cylindrical body may be installed such that sealed fluid is present at opposite ends thereof, and is provided with a gap between the plurality of thin plates for allowing the sealed fluid to enter and exit from opposite ends thereof.

According to this aspect, pressure generated by the viscous drag of the sealed fluid can be efficiently obtained.

According to a fourth aspect of the present invention, in the sealing device in any one of the first to third aspects, the corrugated shape of the multi-layered cylindrical body may be set such that, when the rotating shaft is at rest, valleys are in contact with the outer peripheral surface of the floating ring, and peaks are in contact with the inner peripheral surface of the housing.

According to this aspect, against the eccentricity of the rotating shaft, a radial restoring force to restore it to its center position can be obtained at all times.

According to a fifth aspect of the present invention, in the sealing device in any one of the first to fourth aspects, the thin plates may be formed of an elastically deformable metallic material.

According to this aspect, the multi-layered cylindrical body easy to produce and having durability can be obtained.

Effect of the Invention

The present invention achieves the following outstanding effects:
(1) The sealing device includes the floating ring in the space between the outer circumference of the rotating shaft and the inner circumference of the housing, and the multi-layered cylindrical body including the plurality of elastically deformable cylindrical thin plates layered on top of each other provided between the outer peripheral surface of the floating ring and the inner peripheral surface of the housing. Consequently, the sealing device capable of imparting a tangential damping force to reduce the whirling of the rotating shaft, to prevent leakage and also have the effect of reducing the vibration of the rotating shaft can be provided.
(2) The multi-layered cylindrical body is formed in a circumferentially corrugated shape. Consequently, the sealing device capable of imparting a radial restoring force against the eccentricity of the rotating shaft to restore it to its center position, to prevent leakage and also have the effect of reducing the vibration of the rotating shaft can be provided.
(3) The multi-layered cylindrical body is installed such that the sealed fluid is present at opposite ends thereof, and is provided with a gap between the plurality of thin plates for allowing the sealed fluid to enter and exit from opposite ends thereof. Consequently, pressure generated by the viscous drag of the sealed fluid can be efficiently obtained.
(4) The corrugated shape of the multi-layered cylindrical body is set such that, when the rotating shaft is at rest, the valleys are in contact with the outer peripheral surface of the floating ring, and the peaks are in contact with the inner peripheral surface of the housing. Consequently, against the eccentricity of the rotating shaft, a radial restoring force to restore it to its center position can be obtained at all times.
(5) The thin plates are formed of an elastically deformable metallic material. Consequently, the multi-layered cylindrical body easy to produce and having durability can be obtained.

DESCRIPTION OF EMBODIMENT

Hereinafter, with reference to the drawings, a mode for carrying out this invention will be described illustratively based on an embodiment. However, the dimensions, materials, shapes, relative arrangements, and others of components described in the embodiment are not intended to limit the scope of the present invention only to them unless otherwise explicitly described.

First Embodiment

Figure 1:
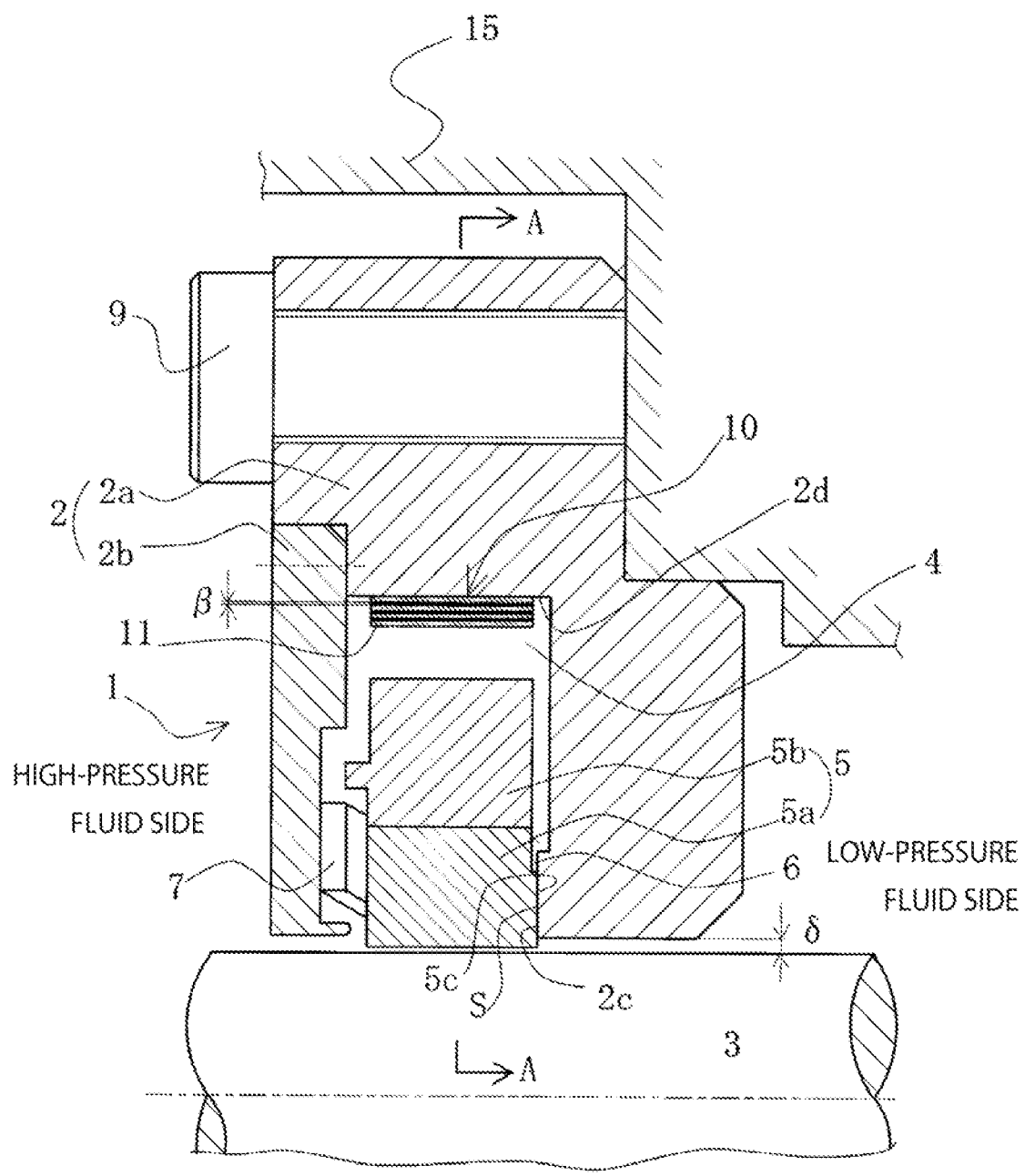
FIG. 1 is a front cross-sectional view schematically showing a sealing device according to a first embodiment of the present invention.
Figure 2:
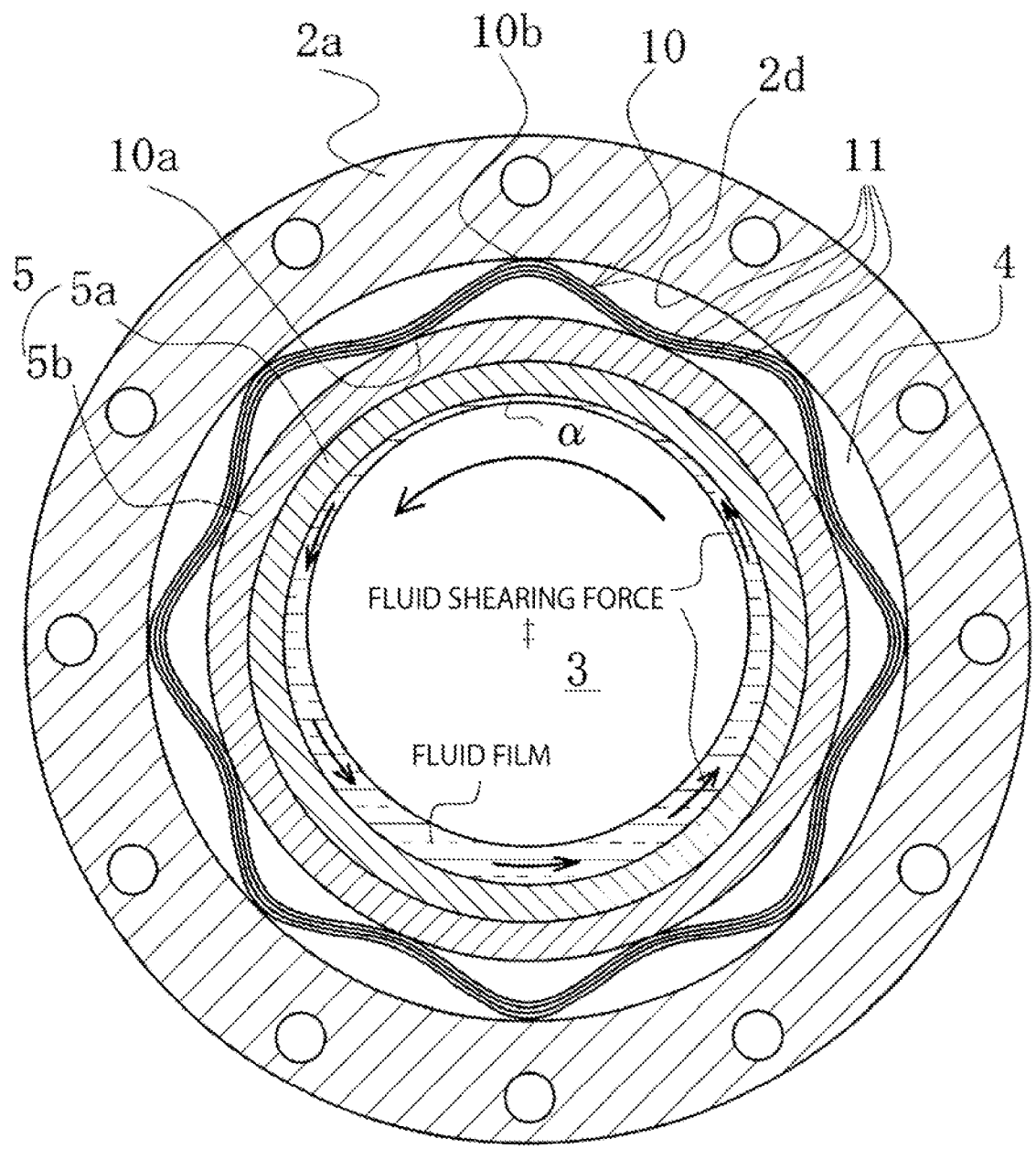
FIG. 2 is a cross-sectional view taken along line A-A in FIG. 1.
Figure 3:
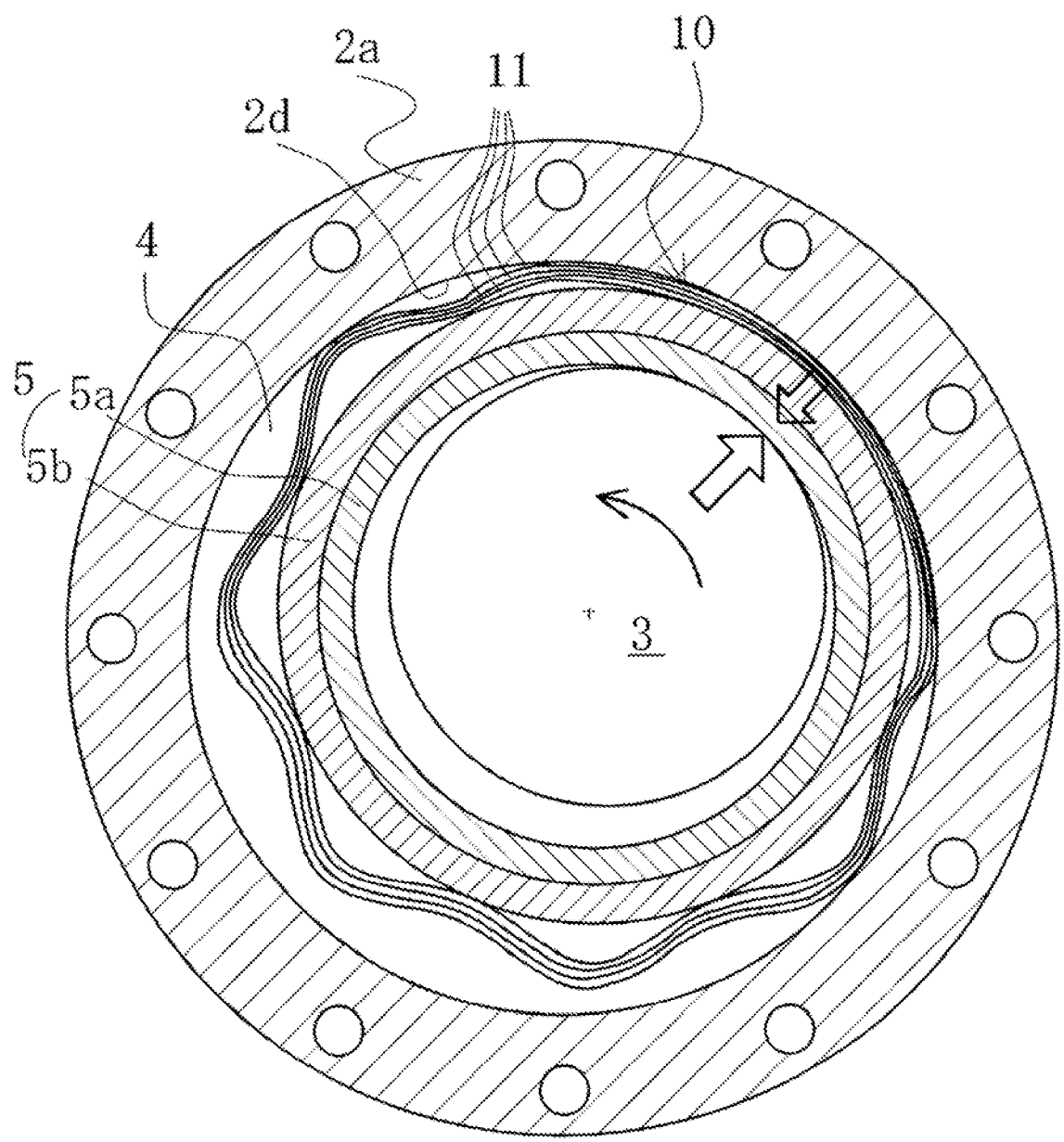
FIG. 3 is a schematic diagram for explaining the effect of reducing the whirling of a rotating shaft in the sealing device according to the first embodiment of the present invention.

With reference to FIGS. 1 to 3, a sealing device according to a first embodiment of the present invention will be described.

In FIG. 1, a rotating shaft 3 of a fluid machine is provided extending through a casing 15. The left side is the high-pressure fluid side, and the right side is the low-pressure fluid side. On the high-pressure fluid side, water, gas, oil, cryogenic fluid, or the like, which is sealed fluid, is sealed in.

A sealing device 1 mainly includes a floating ring 5 and a housing 2 placing the floating ring 5.

The housing 2 is mainly formed of a housing body 2a and a cover member 2b. The housing body 2a is fixed to the casing 15 by fastening means 9. A space 4 defined by a radially inner portion of the housing body 2a and the cover member 2b is formed. The cover member 2b is fixed to the housing body 2a by a fastener.

A radial clearance 5 is provided between an inner peripheral surface of the housing 2 and an outer peripheral surface of the rotating shaft 3. To seal the clearance 5, the floating ring 5 of a hollow cylindrical shape is provided around the outer circumference of the rotating shaft 3. The floating ring 5 is formed integrally or separately, depending on its diameter.

The floating ring 5 has a floating ring body 5a formed of a material with an excellent self-lubricating property such as carbon, and a metallic support ring 5b fitted on the radially outer side of the body 5a, and is formed such that it is not broken even when the floating ring body 5a is brought into contact with the rotating shaft 3 due to the whirling of the rotating shaft 3.

The diameter and the width of the space 4 in the housing 2 are set to be larger than the outer diameter and the width of the floating ring 5. The housing body 2a has an inner surface 2c formed to be in contact with a low-pressure-side side surface 5c of the floating ring body 5a.

The inner diameter of the floating ring 5 is set to be slightly larger than the outer diameter of the rotating shaft 3, so that the floating ring 5 can move radially in a certain range. The radial clearance between the rotating shaft 3 and the floating ring 5 is set to be extremely small to minimize the leakage of the sealed fluid through the clearance.

A sealing face S is formed at a contact portion between the low-pressure-side side surface 5c of the floating ring body 5a and the inner surface 2c of the housing body 2a opposite the side surface 5c. The sealing face S is provided with an introduction recess 6 for introducing the sealed fluid in the space 4 to maintain good lubrication of the sealing face S.

The floating ring 5 is pressed against the inner surface 2c of the housing body 2a by the sealed fluid at high pressure, preventing leakage between the floating ring 5 and the housing body 2a at the sealing face S.

A spring 7 may be provided to bias the floating ring 5 toward the inner surface 2c of the housing body 2a.

The floating ring 5 is provided with a rotation-preventing pin (not shown) extending axially. The rotation-preventing pin is loosely fitted into a groove provided in the housing 2, thereby preventing the rotation of the floating ring 5.

Rotation-preventing means for the floating ring 5 is not limited to the rotation-preventing pin.

FIG. 2 is a cross-sectional view taken along line A-A in FIG. 1, and shows a state where the rotating shaft 3 starts to rotate.

Now, when the rotating shaft 3 starts to rotate in a counterclockwise direction, a force to lift the floating ring 5 is generated by the wedge effect at a clearance a caused by the sealed fluid interposed between the rotating shaft 3 and the floating ring 5. At this time, if the weight of the floating ring 5>the force to lift the floating ring 5 generated due to the wedge effect between the rotating shaft 3 and the floating ring 5, the center of the floating ring 5 is located below the center of the rotating shaft 3. In this state, a fluid film interposed between the outer circumference of the rotating shaft 3 and the inner circumference of the floating 5 is locally thinner. Consequently, there is a risk of contact between the inner peripheral surface of the floating ring 5 and the outer peripheral surface of the rotating shaft 3 when the rotating shaft 3 starts such behavior as whirling. To avoid such a risk, it is necessary to set a large clearance between the inner peripheral surface of the floating ring 5 and the outer peripheral surface of the rotating shaft 3. Unfortunately, an increase in the clearance results in an increase in the amount of leakage of the sealed fluid from the clearance in proportion to the third power of the clearance.

The present invention provides a sealing device that prevents leakage and also has the effect of reducing the vibration of the rotating shaft 3 by imparting a radial restoring force against the eccentricity of the rotating shaft 3 to restore it to its center position, and a tangential damping force to reduce the whirling of the rotating shaft 3. For that purpose, as shown in FIGS. 1 and 2, a multi-layered cylindrical body 10 including a plurality of elastically deformable cylindrical thin plates 11 layered on top of each other is provided between the outer peripheral surface of the floating ring 5 and the inner peripheral surface of the housing 1.

As shown in FIGS. 1 and 2, the multi-layered cylindrical body 10 includes the plurality of elastically deformable cylindrical thin plates 11 layered on top of each other. The plurality of thin plates 11 can radially move relative to each other, and is held not to axially move relative to each other.

The multi-layered cylindrical body 10 has a circumferentially corrugated shape.

The corrugated shape of the multi-layered cylindrical body 10 is set such that, when the rotating shaft 3 is at rest, valleys 10a are in contact with the outer peripheral surface of the floating ring 5, and peaks 10b are in contact with a radially inner peripheral surface 2d of the housing body 2a defining the space 4.

Thus, when the rotating shaft 3 is decentered, a radial restoring force to push the rotating shaft 3 back to its center position acts due to the leaf spring action of the multi-layered cylindrical body 10, so that the rotating shaft 3 can be pushed back to its center position. Consequently, the sealing face S between the side surface 5c of the floating ring 5 and the side surface 4a of the housing 1 can be maintained in a normal state to maintain the sealing effect.

As shown in FIG. 1, the width (axial length) of the multi-layered cylindrical body 10 is set to be substantially equal to the width of the floating ring 5. The sealed fluid is present on opposite sides of the multi-layered cylindrical body 10.

The plurality of thin plates 11 constituting the multi-layered cylindrical body 10 is formed of an elastic material, e.g. a metallic material having elasticity. A gap β is provided between the radially adjacent thin plates 11, for allowing the sealed fluid to enter and exit from opposite ends thereof (see FIG. 1). The gap β is set to an appropriate size depending on the type of the sealed fluid. When the thin plates 11 have undulation and surface roughness, only by placing the plurality of thin plates 11 on top of each other, the slight gap β is formed. Thus, there is no need to provide special means to form the gap β between the adjacent thin plates 11. However, if necessary, protrusions may be provided on the surfaces of the thin plates 11, or spacers may be interposed between the adjacent thin plates, to provide the desired gap β between the adjacent thin plates 11.

Although the number of the thin plates 11 is four in the present embodiment, it is not limited to this and may be two or more.

Next, with reference to FIG. 3, in the sealing device according to the present invention, the effect of reducing the whirling of the rotating shaft 3 when it whirls with a certain period in a state decentered from its center will be described.

Assume a state where the rotating shaft 3 is decentered to the upper right from its center as shown in FIG. 3 in a whirling state of the rotating shaft 3. The floating ring 5 is pressed by the rotating shaft 3 and moves to the upper-right or radially outwards. When the floating ring 5 moves to the upper-right or radially outwards, an upper right portion of the multi-layered cylindrical body 10 is compressed. The gap β between the plurality of thin plates 11 of the multi-layered cylindrical body 10 becomes smaller at the compressed portion, causing the sealed fluid present in the gap β to flow out from the ends to the outside of the thin plates 11. During the flowing out of the sealed fluid, pressure is generated due to the viscous drag of the sealed fluid (damper) (in the present description, sometimes referred to as a viscous squeeze action).

The pressure generated by the viscous squeeze action is transmitted to the rotating shaft 3 via the floating ring 5, acting as a tangential damping force to reduce the whirling of the rotating shaft 3.

On the other hand, at the lower left opposite to the movement direction of the floating ring 5, the space between the outer peripheral surface of the support ring 5b and the inner peripheral surface 2d of the housing body 2a becomes large, so that the gap β between the plurality of thin plates 11 of the multi-layered cylindrical body 10 becomes large. The sealed fluid present outside the multi-layered cylindrical body 10 flows into the gap β between the thin plates 11 from the ends of the thin plates 11. The gap β is filled with the sealed fluid.

To increase pressure generated by the viscous squeeze action, it is necessary to increase the total amount of viscous drag during the flowing out of the sealed fluid. By increasing the number of the thin plates 11, the total amount of viscous drag can be increased.

The sealing device according to the first embodiment of the present invention is as described above, and has the following outstanding advantages:

(1) In the sealing device including the floating ring 5 in the space 4 between the outer circumference of the rotating shaft 3 and the inner circumference of the housing 1, the multi-layered cylindrical body 10 including the plurality of elastically deformable cylindrical thin plates 11 layered on top of each other is provided between the outer peripheral surface of the floating ring 5 and the inner peripheral surface of the housing 1. Consequently, the sealing device capable of imparting a tangential damping force to reduce the whirling of the rotating shaft, to prevent leakage and also have the effect of reducing the vibration of the rotating shaft can be provided.

(2) The multi-layered cylindrical body 10 is formed in the circumferentially corrugated shape. Consequently, the sealing device capable of imparting a radial restoring force against the eccentricity of the rotating shaft to restore it to its center position, to prevent leakage and also have the effect of reducing the vibration of the rotating shaft can be provided.

(3) The multi-layered cylindrical body 10 is installed such that the sealed fluid is present at opposite ends thereof. Between the plurality of thin plates 11, the gap β for allowing the sealed fluid to enter and exit from opposite ends thereof is provided. Consequently, pressure generated by the viscous drag of the sealed fluid can be efficiently obtained.

(4) The corrugated shape of the multi-layered cylindrical body 10 is set such that, when the rotating shaft 3 is at rest, the valleys 10a are in contact with the outer peripheral surface of the floating ring 5, and the peaks 10b are in contact with the inner peripheral surface 2d of the housing. Consequently, against the eccentricity of the rotating shaft 3, a radial restoring force to restore it to its center position can be obtained at all times.

(5) The thin plates 11 are formed of an elastically deformable metallic material. Consequently, the multi-layered cylindrical body 10 easy to produce and having durability can be obtained.

Although the embodiment of the present invention has been described above with reference to the drawings, its specific configuration is not limited to the embodiment. Any changes and additions made without departing from the scope of the present invention are included in the present invention.

For example, although the above embodiment has described the case where the width of the multi-layered cylindrical body 10 is substantially equal to the width of the floating ring 5, the width of the multi-layered cylindrical body 10 is not limited to this and may be made larger than the width of the floating ring 5 to the extent possible without preventing the axial movement of the floating ring 5, for example.

Further, for example, although the above embodiment has described the case where the thin plates 11 are formed of a metallic material having elasticity, the thin plates 11 are not limited to this and may be formed of a synthetic resin material having elasticity.

Further, for example, although the above embodiment has described the case where the number of the thin plates 11 constituting the multi-layered cylindrical body 10 is four, the number of the thin plates 11 is not limited to this and may be two or more.

Further, for example, the above embodiment has described the case where protrusions are provided on the surfaces of the thin plates 11 or spacers are interposed between the adjacent thin plates as means for forming the gap β between the adjacent thin plates 11. Protrusions or spacers may be spaced evenly in the circumferential direction and be aligned in the axial direction, for example, to prevent the protrusions or the spacers from obstructing the inflow and outflow of fluid.

Although the present invention is applied to the sealing device as the principle purpose, it may be applied to a damping device for damping the vibration of a shaft.

REFERENCE SIGNS LIST 1 sealing device
2 housing
2a housing body
2b cover member
2c inner surface
2d inner peripheral surface
3 rotating shaft
4 space
5 floating ring
5a floating ring body
5b support ring
5c low-pressure-side side surface
6 introduction recess
7 spring
9 fastener
10 multi-layered cylindrical body
10a valley
10b peak
11 thin plate
15 casing
S sealing face
δ clearance between inner peripheral surface of housing and outer peripheral surface of rotating shaft
α clearance between rotating shaft and floating ring
β gap between thin plates

The invention claimed is:

1. A sealing device comprising:
a floating ring in a space between an outer circumference of a rotating shaft and an inner circumference of a housing, wherein the floating ring is constituted by a floating ring body made of carbon, and a metallic support ring fitted on an outer periphery of the floating ring body; and
a multi-layered cylindrical body including a plurality of elastically deformable cylindrical thin plates layered on top of each other provided between an outer peripheral surface of the floating ring and an inner peripheral surface of the housing,
wherein the multi-layered cylindrical body is formed in a circumferentially corrugated shape, and the corrugated shape of the multi-layered cylindrical body is set such that, when the rotating shaft is at rest, valleys are in contact with the outer peripheral surface of the floating ring and peaks are in contact with the inner peripheral surface of the housing.

2. The sealing device according to claim 1, wherein the multi-layered cylindrical body is provided such that sealed fluid is present at opposite ends thereof, and is provided with a gap between the plurality of thin plates for allowing the sealed fluid to enter and exit from opposite ends thereof.

3. The sealing device according to claim 1, wherein the thin plates are formed of an elastically deformable metallic material.

4. The sealing device according to claim 2, wherein the thin plates are formed of an elastically deformable metallic material.

* * * * *